3,206,589
ELECTRIC LIQUID HEATING DEVICE
William M. Ryan and Lawrence D. Waldron, Jr., Minneapolis, Minn., assignors to Byrd Plastics, Inc., Erie, Pa., a corporation of Pennsylvania
Filed May 23, 1963, Ser. No. 282,768
1 Claim. (Cl. 219—293)

This invention relates to heating devices and, more particularly, to devices for heating water in a cup preparatory to making beverages such as tea, coffee, or other hot foods and beverages.

Previous devices which were used for heating water in cups either used resistance type heating elements or had other heating devices which were subject to erosion or were difficult to maintain in a sanitary condition and presented a hazard to the operator.

It is, accordingly, an object of the present invention to provide an improved heating device for liquids.

Another object of the invention is to provide an improved heating device for use in heating liquids in cups.

Still another object of the invention is to provide a heating device which uses the liquid itself as a heating element and is easy to maintain in a santitary condition as well as being safe for the operator.

A further object of this invention is to provide a heating device which is simple in construction, economical to manufacture, and simple to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

Figure 1:
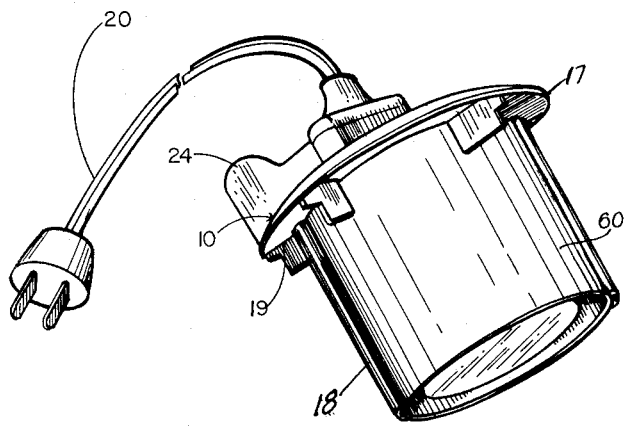
FIG. 1 is an isometric view of the device according to the invention.
Figure 2:
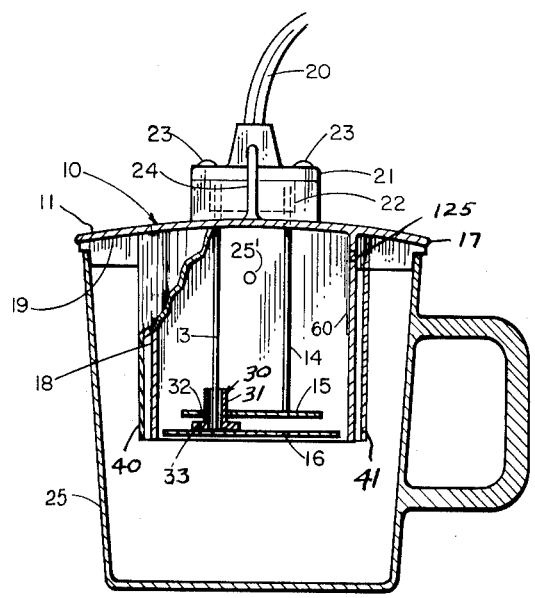
FIG. 2 is an axial cross sectional view of the heating device shown in FIG. 1.

Now with more particularly reference to the drawing, the heating device is indicated at 10. The heating device 10 has a top 11 with an outwardly directed rim 17 which is of suitable size to rest on the rim of a cup 25.

Hollow insulated rib members 40 and 41 are attached to the rim 17 at the top and are slightly smaller in diameter than the inside of a cup so they can fit therein. Circumferentially spaced, radially extending bosses 19 are integral with the hollow rib members 40 and 41 and the top 11. They terminate inside the edge of the top 11 and snugly fit into the cup 25. The bosses 19 extend from the hollow rib members 40 and 41 toward the periphery of the rim 17 and are fixed to the lower side of the rim 17.

A hollow cylindrical member 60 having an open bottom is fixed to the top 11. It has the rib members 40 and 41 fixed to its outside. Holes 125 communicate with channels 18 in the hollow rib members 40 and 41. Thus, when the liquid inside the hollow cylindrical member 60 is boiled, steam will be forced up by convection through the holes 125 into the channels 18 where it will pass down through the channels 18 and bubble up through the water and thus distribute the heat evenly.

The top 11 has an upwardly extending boss 22 molded integrally thereon. To the boss 22 is attached an electrical cord 20 having a plug of the type commonly known as a "cheater" cord. The plug is held to the boss 22 by screws 23. A handle 24 is integrally attached to the top 11 and, also, to the boss 22. The handle 24 forms a reinforcement for the boss 22.

Spaced electrodes 15 and 16 are round and disk like and spaced one above the other approximately one-sixteenth to one-eighth inch apart and disposed in parallel planes. The electrode 16 is attached to a terminal rod 13 and the electrode 15 is attached to a terminal rod 14. These terminal rods are inserted in the electrode openings in plug 21 and thus electrically connect the electrodes 15 and 16 to the lead wires of cord 20. The rods 13 and 14 are pressed into the boss 22 and form, in effect, a receptacle for the plug on the end of the cord 20.

A spacer 30 is made in the form of a flanged boss of insulation material such as plastic. It is made up of a boss 31 which fits into a hole 32 in the electrode 15 and a flange 33 which forms a spacer for the electrodes 15 and 16.

The spacer 30 acts as an insulator and safety factor so that the electrode 15 cannot touch the electrode 16.

The device is used by inserting the hollow cylindrical member 60 and the hollow rib members 40 and 41 into a container of liquid. The electrodes 15 and 16 will be immersed in the liquid. When the plug connected to the cord 20 is connected to a suitable source of electricity, the electricity will flow through the liquid between the electrodes 15 and 16. The resistance of the liquid to the flow of electricity will generate heat in the liquid.

The foregoing specification sets forth the invention in its preferred practical forms but it will be understood that the structure shown is capable of modification within a range of equivalents without departing from the invention which is to be understood is broadly novel as is commensurate with the appended claim.

The embodiments of the invention in which an exclusive property or privilege is claimed are defined as follows:

A device for heating liquid in a container comprising
a generally flat top having a rim adapted to rest on the rim of a container and having a hollow cylindrical member having an open bottom attached to the lower side of said top at one end and extending downwardly therefrom,
a first boss integrally attached to the upper side of said top,
terminal rods molded into said boss and extending upwardly therefrom and downwardly into said cylindrical member,
said rods each terminating at its lower end,
an electrical cord having contact members with openings receiving the upper ends of said rods,
two spaced plates made of electrical conducting material disposed in said cylindrical member,
one plate being connected to the lower end of one of said rods and the other plate connected to another of said rods,
said plates being disposed in planes generally parallel to each other,
a flanged member made of insulation material on the lower end of one said rod surrounding said one rod and extending through a hole in one said plate insulating one said rod from said plate, said flanged member forming a spacer holding said plates in fixed spaced relation from each other, and a hollow rib attached to the underside of said top and disposed on the exterior of said hollow cylindrical member and extending radially outwardly therefrom, the hollow in said rib having a channel therein being open at the bottom and having its upper end communicating with said hollow in said cylindrical member whereby steam collected above said liquid is directed through said hollow rib to said liquid.

References Cited by the Examiner

UNITED STATES PATENTS

| 1,878,587 | 9/32 | Lawner | 219—275 |
| 1,949,778 | 3/34 | Brown et al. | 219—276 |
| 2,806,932 | 9/57 | Conlin et al. | 219—275 |

FOREIGN PATENTS

| 606,533 | 3/26 | France. |
| 624,560 | 4/27 | France. |
| 531,286 | 8/31 | Germany. |

RICHARD M. WOOD, *Primary Examiner.*

ANTHONY BARTIS, *Examiner.*